US010512338B1

(12) United States Patent
Hawkins et al.

(10) Patent No.: US 10,512,338 B1
(45) Date of Patent: Dec. 24, 2019

(54) FURNITURE ASSEMBLY WITH METAL SEAT STRETCHER

(71) Applicant: Ashley Furniture Industries, Inc., Arcadia, WI (US)

(72) Inventors: John Hawkins, Ecru, MS (US); Jason Lambert, Ecru, MS (US); Joe Kushner, Ecru, MS (US)

(73) Assignee: Ashley Furniture Industries, Inc., Arcadia, WI (US)

( * ) Notice: Subject to any disclaimer, the term of this patent is extended or adjusted under 35 U.S.C. 154(b) by 146 days.

(21) Appl. No.: 15/630,607

(22) Filed: Jun. 22, 2017

Related U.S. Application Data

(60) Provisional application No. 62/513,835, filed on Jun. 1, 2017.

(51) Int. Cl.
*A47C 19/02* (2006.01)
*A47C 4/02* (2006.01)
*A47C 7/02* (2006.01)
*A47C 3/00* (2006.01)
*A47C 17/00* (2006.01)
*B23P 17/00* (2006.01)

(52) U.S. Cl.
CPC .............. *A47C 19/02* (2013.01); *A47C 4/028* (2013.01); *A47C 7/02* (2013.01); *A47C 3/00* (2013.01); *A47C 17/00* (2013.01); *B23P 17/00* (2013.01)

(58) Field of Classification Search
CPC .. A47C 3/00; A47C 4/028; A47C 7/02; A47C 17/00; A47C 19/02; B23P 17/00
See application file for complete search history.

(56) References Cited

U.S. PATENT DOCUMENTS

| | | | | | |
|---|---|---|---|---|---|
| 3,874,729 | A | * | 4/1975 | Blodee | A47C 4/022 297/448.2 |
| 3,914,914 | A | * | 10/1975 | Jureit | A47C 19/025 52/632 |
| 5,894,614 | A | * | 4/1999 | Stroud | A47B 91/028 5/200.1 |
| 6,415,465 | B1 | * | 7/2002 | Harrow | A47C 19/027 5/184 |
| 6,637,812 | B2 | * | 10/2003 | Laughlin | A47C 4/02 297/118 |
| 6,942,298 | B2 | * | 9/2005 | Harrison | A47C 4/02 297/440.1 |
| 7,438,362 | B2 | * | 10/2008 | Dotta | A47C 7/28 29/428 |

(Continued)

*Primary Examiner* — James M Ference
(74) *Attorney, Agent, or Firm* — Christensen, Fonder, Dardi & Herbert PLLC

(57) ABSTRACT

A metal seat stretcher that is configured for easy mounting to the seat box, and furniture items including the same. The disclosed stretcher may be mounted in such a way so as not be directly mounted to the forward or rearward rails, thus preserving the strength and integrity of the rails by not subjecting them to perforation from a multitude of staples. Instead, the front end of the metal seat stretcher mounts to a clip rail that is secured to the inside of the front rail, and back end of the stretcher is secured to a seat back upright. In some embodiments, securing of the disclosed seat stretcher is done with a single screw at the front end and a single self-tapping bolt at the back end (though more fasteners may also be utilized). This provides for rapid and easy assembly of the furniture item.

20 Claims, 5 Drawing Sheets

(56) References Cited

U.S. PATENT DOCUMENTS

| | | | |
|---|---|---|---|
| 8,408,653 B2 | 4/2013 | Griggs, Jr. | |
| 9,241,575 B2* | 1/2016 | Wang | A47C 31/00 |
| 9,345,331 B2 | 5/2016 | Saval et al. | |
| 9,480,338 B2* | 11/2016 | Griggs, Jr. | A47C 4/028 |
| 2003/0151292 A1* | 8/2003 | McLarty | A47C 4/02 |
| | | | 297/440.15 |
| 2003/0151293 A1* | 8/2003 | McLarty | A47C 4/02 |
| | | | 297/440.15 |
| 2007/0226902 A1* | 10/2007 | Lin | A47C 19/005 |
| | | | 5/201 |
| 2009/0235451 A1* | 9/2009 | Gorkin | A47C 4/022 |
| | | | 5/12.2 |
| 2010/0264715 A1* | 10/2010 | Griggs, Jr. | A47C 4/02 |
| | | | 297/440.1 |
| 2012/0146382 A1* | 6/2012 | Griggs, Jr. | A47C 4/08 |
| | | | 297/440.1 |
| 2012/0217784 A1* | 8/2012 | Griggs, Jr. | A47C 4/08 |
| | | | 297/440.1 |
| 2012/0248836 A1* | 10/2012 | Lejcher | A47C 17/02 |
| | | | 297/232 |
| 2014/0375103 A1* | 12/2014 | Lejcher | A47C 4/028 |
| | | | 297/440.1 |
| 2015/0102651 A1* | 4/2015 | Saval | A47C 7/02 |
| | | | 297/463.1 |
| 2015/0305504 A1* | 10/2015 | Robinson | A47C 7/16 |
| | | | 297/452.18 |

* cited by examiner

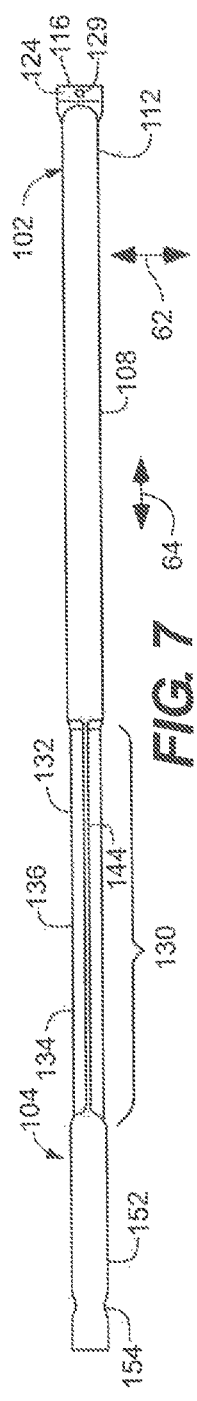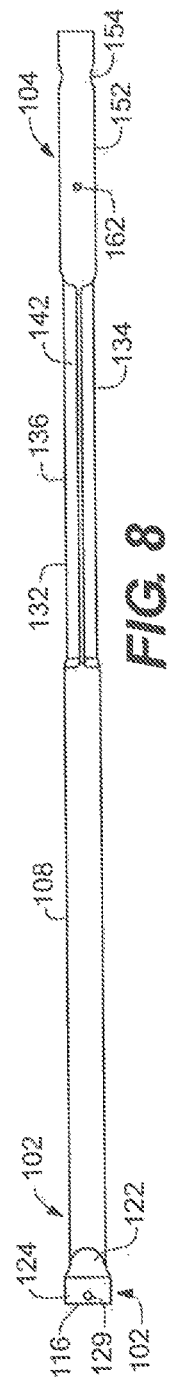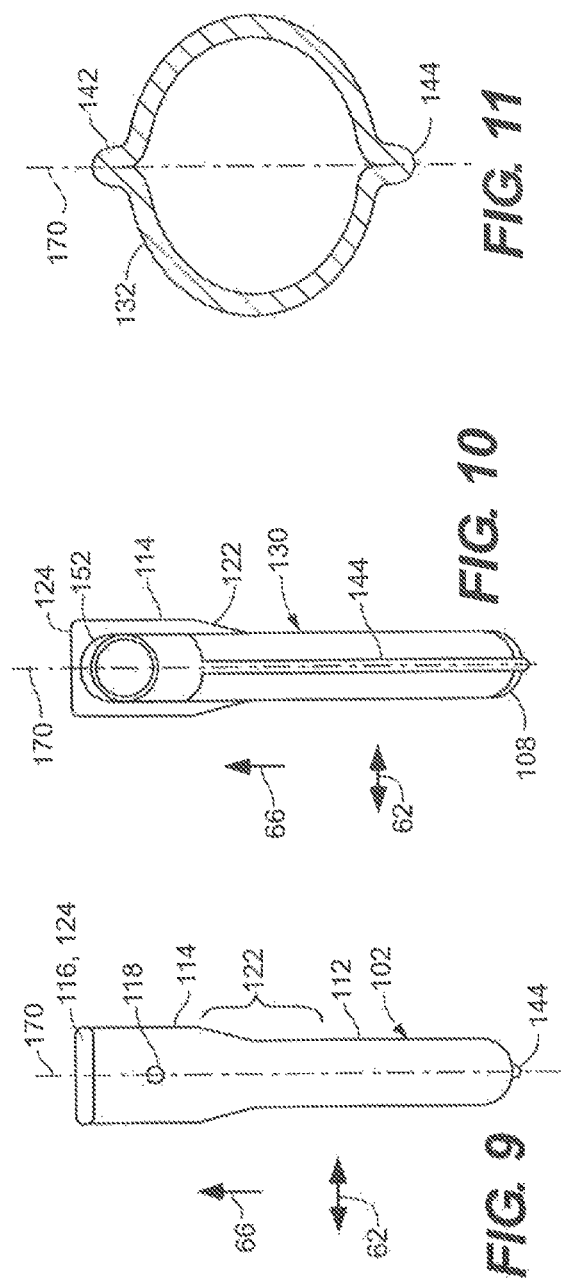

FURNITURE ASSEMBLY WITH METAL SEAT STRETCHER

RELATED APPLICATIONS

This application claims the benefit of U.S. Provisional Patent Application No. 62/513,835, filed Jun. 1, 2017, the disclosure of which is incorporated by reference herein in its entirety.

FIELD OF THE DISCLOSURE

The present disclosure is directed to generally to furniture assemblies and more specifically to cross members or "seat stretchers" for multi-seat furniture items such as sofas, couches, love seats, sectionals and the like.

BACKGROUND OF THE DISCLOSURE

Multi-seat furniture items typically implement cross members referred to as "seat stretchers" that are joined to and extend between a front rail and a back rail of a seat box. The seat stretchers are so-named because they maintain the spacing between the front and back rails so that the sinuous springs can be "stretched" without seriously distorting the seat box. Conventional seat stretchers typically include a forward block and a rearward block separated by a beam, all of which are typically made from wood or wood composite. The forward and rearward blocks are mounted directly to the inside faces of the forward and rearward rails, respectively, by staples that run through the blocks and rails.

The primary failure mode of furniture items that implement such stretchers are fracturing or splitting of the beam, or disconnection of the forward or rearward block from the respective rail to which it is joined. An improved seat stretcher that remedies these failure modes would be welcomed.

SUMMARY OF THE DISCLOSURE

Various embodiments of the disclosure provide a metal seat stretcher that is configured for easy mounting to the seat box of a furniture item, such as a sofa, love seat, or sectional. The disclosed stretcher may be mounted in such a way so as not to be directly mounted to the forward or rearward rails, thus preserving the strength and integrity of the rails by not subjecting them to perforation from a multitude of staples. Instead, the front end of the metal seat stretcher mounts to a forward clip rail that is secured to the inside of the front rail, and back end of the stretcher is secured to a seat back upright. In some embodiments, the back seat upright is formed as a unitary component, eliminating joints and the attendant perforation from the multitude of staples required of conventional uprights. In some embodiments, securing of the disclosed seat stretcher is done with a single screw at the front end and a single self-tapping bolt at the back end (though more fasteners may also be utilized). This provides for rapid and easy assembly of the furniture item.

Surprisingly, despite the use of only the single screw at the front end and the single self-tapping bolt at the back end, the durability of the disclosed seat stretcher and support mechanisms thereof has been found to far surpass the performance of conventional seat stretchers, both in laboratory testing and in the marketplace. Within the first year of production, over a million such seat stretchers have been installed in various furniture assemblies, with only one documented failure of the seat stretcher support.

Structurally seat stretcher for a furniture assembly is disclosed, comprising a forward end portion and a rearward end portion separated by a middle portion, the forward end portion including an arcuate segment that extends from the middle portion in an upward direction, and a mounting tab segment at a forward extremity of the forward end portion, the mounting tab segment defining a mounting hole that extends through the mounting tab segment. The rearward end portion includes an angled segment having a first leg and a second leg that extend from an apex and defining an obtuse angle, the first leg extending from the middle portion, the second leg extending upward from the apex. The angled segment may include upper and lower rib portions that are diametrically opposed and are coplanar with the obtuse angle. The rearward end portion includes a rearward mounting segment that extends from the second leg of the angled portion, the rearward mounting segment defining a mounting hole that extends laterally through the rearward mounting segment. The forward end portion, the rearward end portion, the middle portion, and the upper and lower rib portions of the reward end portion are substantially centered about a common mid plane and are formed of a metal tubular body.

In some embodiments, the middle portion is a straight segment defining a linear axis. The first leg of the angled segment may be concentric with the linear axis of the middle portion. The arcuate segment may be arcuate through a 90 degree angle. In some embodiments, the mounting tab segment includes a base that extends from the arcuate segment and a forward projection at the forward extremity of the forward end portion. The forward projection of the tab segment may include a bottom surface that is substantially perpendicular to a forward surface of the base. In some embodiments, the upper and lower rib portions extend an entire length of the angled segment.

In various embodiments of the disclosure, a furniture assembly is disclosed, comprising a main box including a front rail and a back rail separated by a pair of side rails to define an interior space, an upright being coupled to an interior face of the back rail, a rearward clip rail supported by the upright and extending substantially parallel to the back rail, and the above-described seat stretcher. The mounting tab segment may be coupled to the front rail with a first fastener that extends through the mounting hole of the mounting tab segment. The rearward end portion extends over and is supported by the rearward clip rail and is affixed to a lateral face of the upright with a second fastener that extends through the mounting hole of the rearward mounting segment. A forward clip rail may be affixed to an interior face of the front rail, the mounting tab segment being affixed to the forward clip rail.

In some embodiments, at least one of the first fastener and the second fastener is a self tapping bolt. The main box and the upright may be of a wooden material. the first spring rail may also be of a wooden material. In some embodiments, a second spring rail that extends parallel to the first spring rail, for registration of one or more of seat cushions. The mounting tab segment may be registered on a top edge of the forward clip rail. More specifically, the forward projection of the tab segment includes a bottom surface may register on the top edge of the forward clip rail, the bottom surface being substantially perpendicular to a forward surface of the base, the forward surface registering against an interior face of the forward clip rail.

BRIEF DESCRIPTION OF THE DRAWINGS

FIG. 7 is bottom plan view of the seat stretcher of FIG. 3;

FIG. 8 is a top plan view of the seat stretcher of FIG. 3;

FIG. 9 is a front elevational view of the seat stretcher of FIG. 3;

FIG. 10 is a rear elevational view of the seat stretcher of FIG. 3; and

FIG. 11 is a sectional view at line XI-XI of FIG. 6 according to an embodiment of the disclosure.

DETAILED DESCRIPTION OF THE FIGURES

Figure 1:
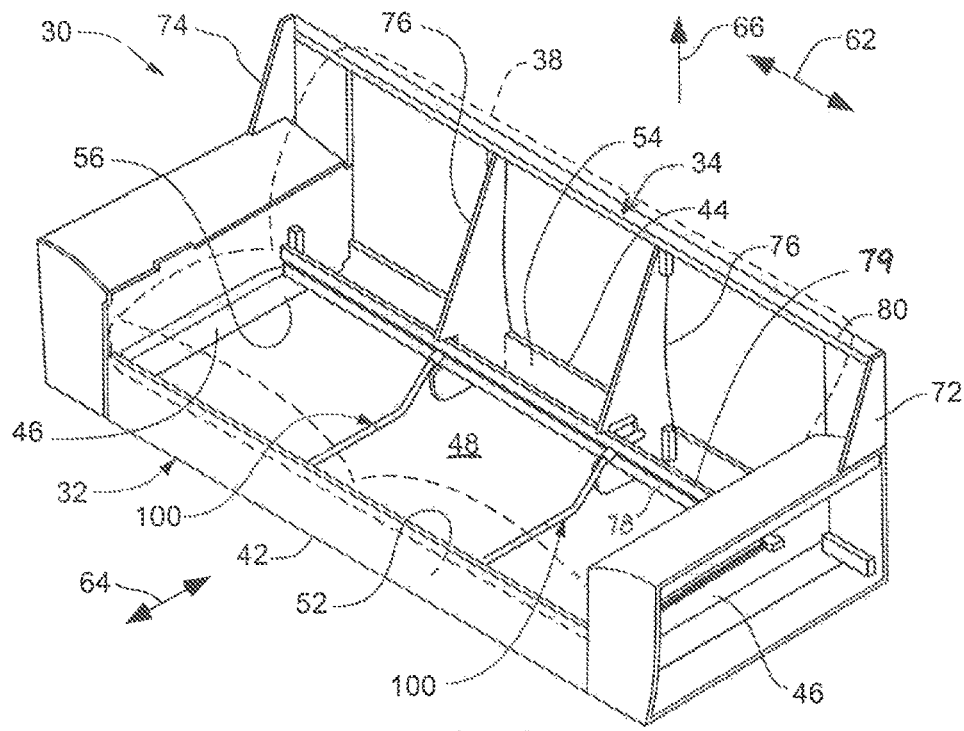
FIG. 1 is a perspective view of a furniture item with the a seat stretcher according to an embodiment of the disclosure.
Figure 1A:
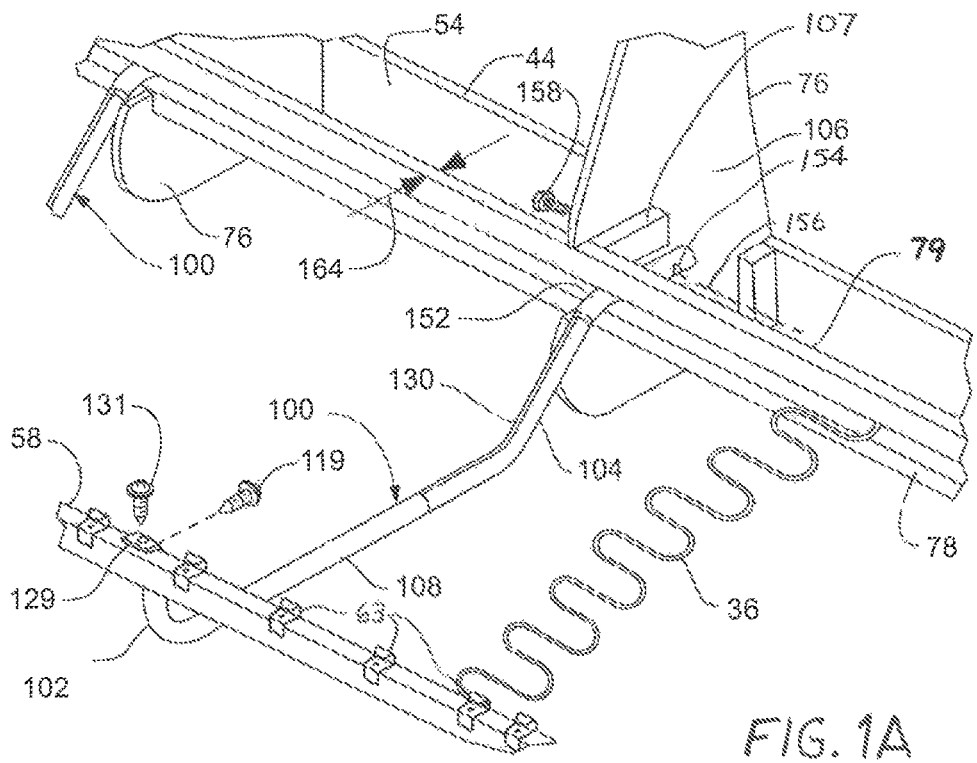
FIG. 1A is a partial view of FIG. 1.
Figure 2:
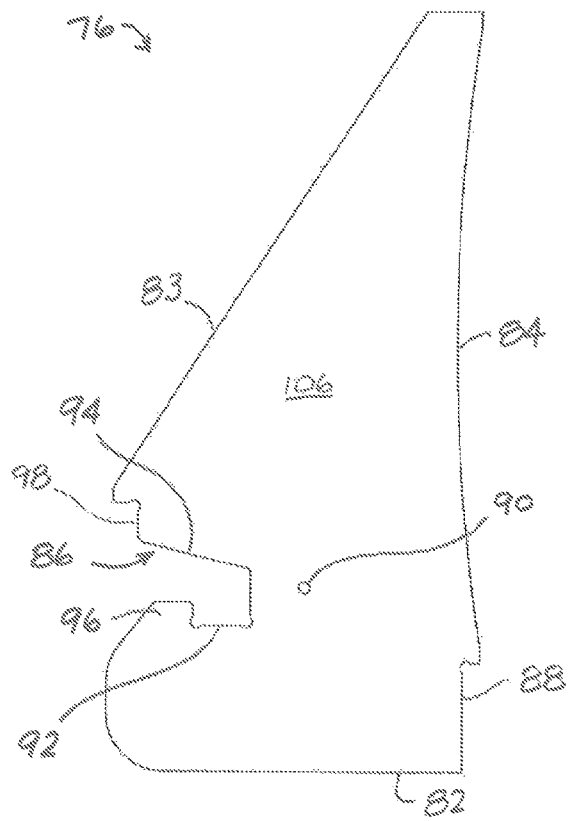
FIG. 2 is a side elevational view of a middle upright of FIG. 1 according to an embodiment of the disclosure.

Referring to FIGS. 1, 1A, 1B, and 2, a seat box assembly 30 is depicted in an embodiment of the disclosure. The seat box assembly 30 includes a main box 32, a back frame assembly 34, and at least one cushion 38. The cushion(s) 38 may be supported, for example, by sinuous springs (one of which is depicted by numerical character 36 at FIGS. 1A and 1B), a webbing, or other decking arrangements available to the artisan. The main box 32 comprises a front rail 42, a back rail 44, separated by two side rails 46. Each of the rails 42, 44, and 46 include a respective interior face 52, 54, and 56 that defines and bounds an interior space 48. A forward clip rail 58 may be affixed to the interior face 52 of the front rail 42, upon which are mounted a plurality of anchor clips 63 for anchoring of the sinuous springs 36.

The back frame assembly 34 may include a pair of side uprights 72 and 74 (i.e., a left upright 72 and a right upright 74) and one or more middle uprights 76, extending vertically from the back rail 44 of the main box 32. The back frame assembly 34 further includes a cap rail 80 that ties the uprights 72, 74, and 76 together. In the depicted embodiment, the back frame assembly 34 also includes a rearward clip rail 78 and a back rest rail 79, supported by the upright(s) 76, and which also act to tie the uprights 76 together. The rearward clip rail 78 also supports a plurality of anchor clips, hidden from view in FIGS. 1 and 1A by the presence of the back rest rail 79. In some embodiments, the back frame assembly 34 is affixed to the back rail 44 of the main box 32. Each of the side uprights 72, 74 can extend upwards from a respective one of the side rails 46. In some embodiments, the middle uprights 76 are disposed within the main box 32 and affixed to the interior surface 54 of the back rail 44. The front and back rails 42 and 44 extend in a lateral direction 62, the side rails 46 extend in a fore/aft direction 64, and the uprights 72, 74, and 76 extend in an upward direction 66 from the main box 32. In some embodiments, the main box 32 or back frame assembly 34 or both are made from wooden or composite materials.

In the depicted embodiment, the middle upright 76 includes a base 82, forward edge 83, and rearward edge 84. A notched mounting structure 86 accessible from the forward edge 83 is formed proximate the base 82. A corner notch 88 may also be defined at the junction of the rearward edge 84 and base 82. In some embodiments, a locating hole 90 that passes laterally through the middle upright 76 is defined rearward of the notched mounting structure 86. The locating hole 90 may be located at a predetermined position on the middle upright 76 that corresponds to the desired location for mounting a seat stretcher when the seat box 30 is assembled. In the depicted embodiment, the notched mounting structure 86 includes a rearward notch 92 bounded by an inclined upper edge 94 and a forward stop 96. The notched mounting structure 86 may also include a forward notch 98 that is above and forward of the rearward notch 92.

One or more seat stretchers 100 span the main box 32 in the fore/aft direction 64. In the depicted embodiment, the seat stretchers 100 are anchored at a forward end portion 102 to the forward clip rail 58, and a rearward end portion 104 is affixed to a lateral face 106 of a respective upright 76. In the depicted embodiment, a tie block 107 is attached to the lateral face 106 of the middle upright 76 immediately behind the back rest rail 79, providing additional surface for fastening (e.g., stapling) the back rest rail 79 to the middle upright 76. The seat stretcher 100 may be formed of a metal tubular body.

Referring to FIGS. 3 through 10, the seat stretcher 100 is depicted according to an embodiment of the disclosure. In the depicted embodiment, the forward end portion 102 and the rearward end portion 104 are separated by a middle portion 108. Also in the depicted embodiment, the forward end portion 102 includes an arcuate segment 112 that extends from the middle portion 108 in the upward direction 66, and a mounting tab segment 114 at a forward extremity 116 of the forward end portion 102. In some embodiments, the arcuate segment 112 is arcuate through an angle β that is substantially 90 degrees. The mounting tab segment may define a mounting hole 118 that extends through the mounting tab segment 114 for accepting a fastener 119, such as a wood screw. The mounting tab segment 114 may also include a base 122 that extends from the arcuate segment 112 and a forward projection 124 at the forward extremity 116 of the forward end portion 102. In some embodiments, the forward projection 124 of the tab segment 114 includes a bottom surface 126 that is substantially perpendicular to a forward surface 128 of the base 122. Optionally, a through hole 129 is formed through the forward projection, which accepts a fastener 131, such as a wood screw.

Figure 1B:
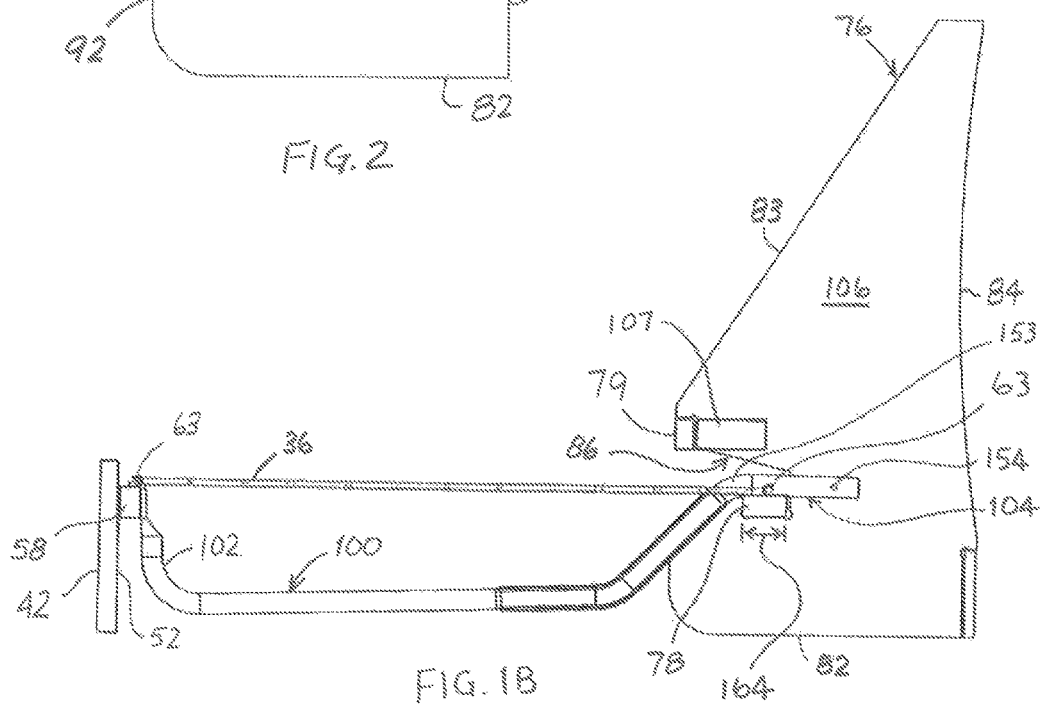
FIG. 1B is a side elevational view of components of the furniture item of FIG. 1 in partial assembly according to an embodiment of the disclosure.
Figure 3:
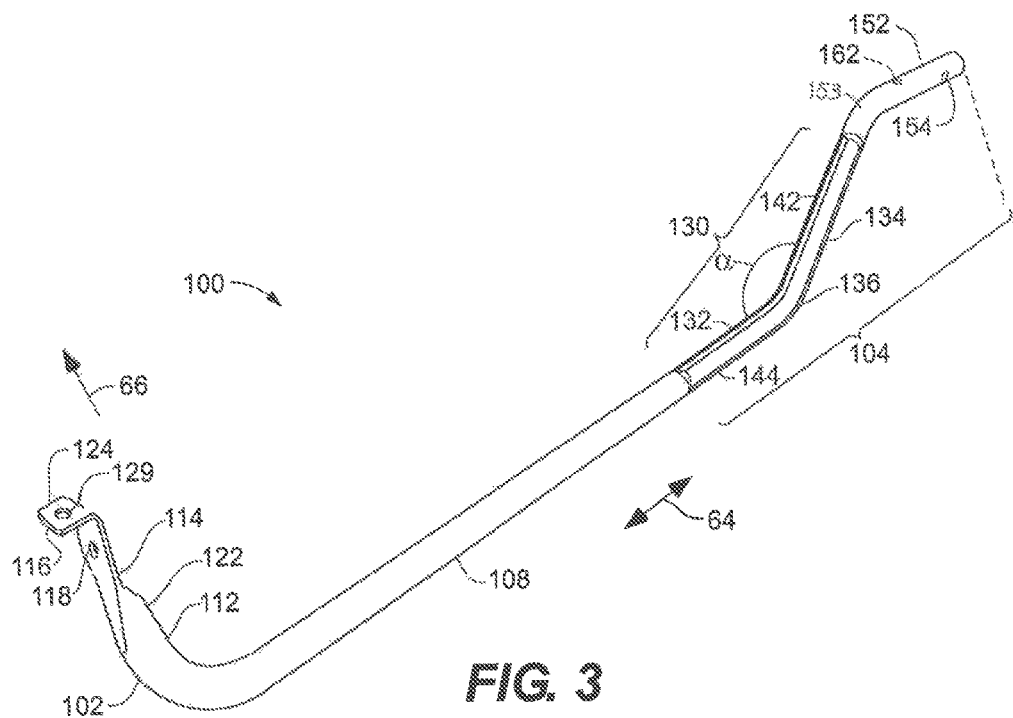
FIG. 3 is a top forward perspective view of a seat stretcher according to an embodiment of the disclosure.
Figure 4:
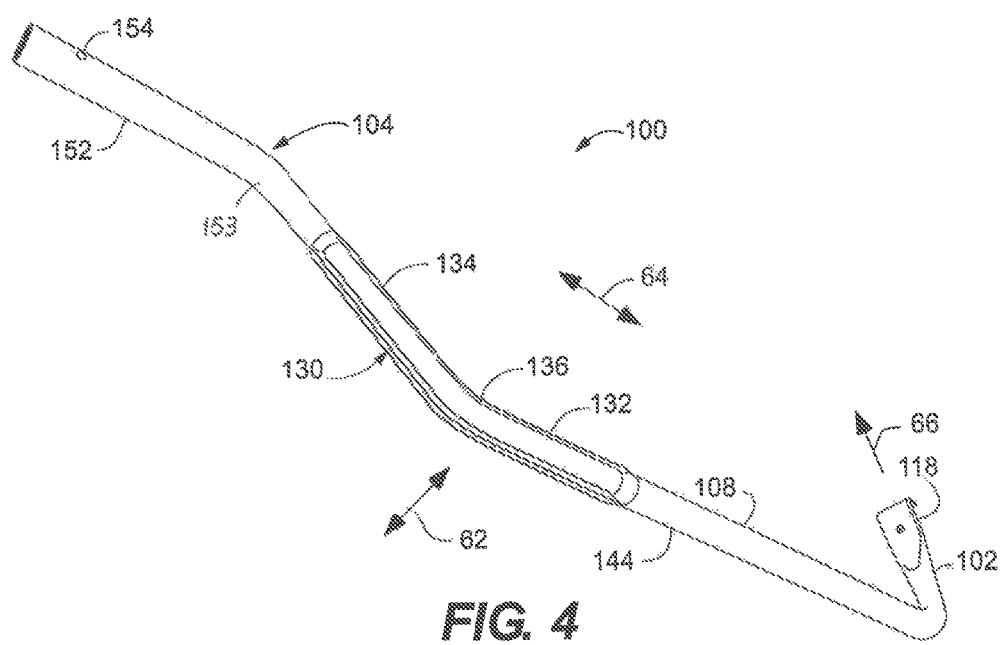
FIG. 4 is a bottom rearward perspective view of the seat stretcher of FIG. 3.

In some embodiments, the rearward end portion 104 includes an angled segment 130 having a first leg 132 and a second leg 134 that extend from an apex 136 and defining an obtuse angle α. The first leg 132 extends from the middle portion 108. The second leg 134 extends upward from the apex 136. The angled segment 130 includes upper and lower rib portions 142 and 144 that are diametrically opposed and are coplanar with the obtuse angle α. The rearward end portion 104 may also include a rearward mounting segment 152 that extends from a rearward apex 153 that transitions from the second leg 134 of the angled portion 130. The rearward mounting segment 152 defines a mounting hole 154 that extends laterally through the rearward mounting segment 152 for accepting a rearward fastener 158. In some embodiments, the rearward fastener 158 is a self-tapping bolt that is inserted through the upright 76 along an axis 156 to tap into the mounting hole 154 of the seat stretcher 100 (FIG. 1B). In this way, the mounting hole 154 effectively acts as a nut for securing the rearward fastener 158 in place. In some embodiments, the rearward fastener 158 is inserted through the locating hole 90. Optionally, a bolt can be routed through the mounting hole 154 and the locating hole 90 to be secured in place with a nut and lock washer (not depicted).

In some embodiments, a hole 162 may be defined in the rearward mounting segment 152 proximate the junction between the rearward mounting segment 152 and the second leg 134 of the angled portion 130. The hole 162 may be a through hole or an aperture accessible from only one side of the rearward mounting segment 152 (e.g., an upper hole that does not pass through the bottom of the rearward mounting segment 152). Placement of the hole 162 may be centered with respect to a thickness 164 of the rearward clip rail 78 as mounted to the upright(s) 76. The hole 162 may be sized for passage of a screw or bolt (not depicted).

Functionally, in some embodiments, the hole 162 functions to hold (suspend) the stretcher during a painting process, and serves no function in the operation of the seat stretcher 100. In other embodiments, the hole 162 can function as an additional anchoring point for the clip rail 78 by running a fastener through the hole 162 and into the clip rail 78.

The forward end portion 102, the rearward end portion 104, the middle portion 108, and the upper and lower rib portions 142 and 144 of the reward end portion 104 are substantially centered about a common mid plane 170. The upper and lower rib portions 142 and 144 may extend the entire length of the angled segment 130. In some embodiments, the middle portion 108 is a straight segment 172 defining a linear axis 174. The first leg 132 of the angled segment 130 may be concentric with the linear axis 174 of the middle portion 108.

Figure 5:
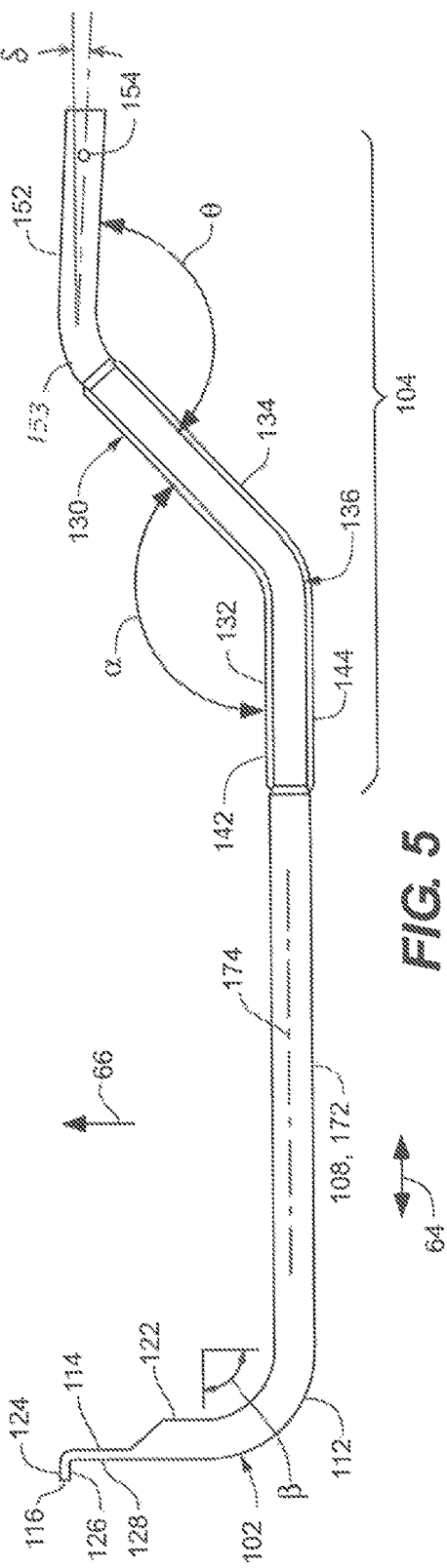
FIG. 5 is a left side elevational view of the seat stretcher of FIG. 3, with spring rail and a clip rail engaging a rearward mounting segment of the seat stretcher in an embodiment of the disclosure.
Figure 6:
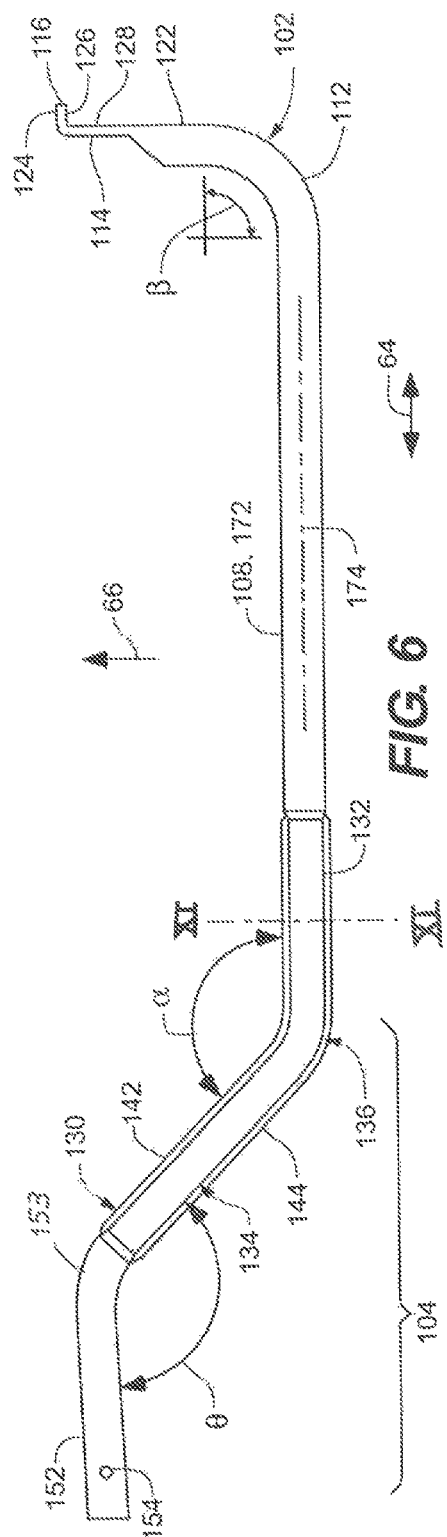
FIG. 6 is a right side elevational view of the seat stretcher of FIG. 3.

In some embodiments, the rearward mounting segment 152 is not parallel to the linear axis 174 of the middle portion 108. That is, an angle θ defined between the mounting segment 152 and the second leg 134 of the angled section 130 that is not equal to the obtuse angle α of the angled section 130, such that the difference between the angles α and θ defines a non-zero angle δ relative to the linear axis 174 of the middle portion 108 (FIG. 5). In the depicted embodiment, the angle θ is less than the obtuse angle α, so that the angle δ slopes downward in a rearward direction.

In operation, the seat stretchers 100 maintain the separation of the front and back rails 42 and 44 due to the load caused by the sinuous springs 36, as well as loads that are imparted on the sinuous springs 36, for example when an occupant or occupants are seated on the seat box assembly 30. Moreover, the seat stretchers must withstand additional forces that are incurred by impact loads, for example when someone jumps on the seat box assembly 30 or an otherwise heavy load is dropped onto the seat box assembly 30. The various loads place the seat stretchers 100 in compression. Accordingly, fastener 119 serves only to hold the forward end portion 102 of the seat stretcher 100 in place and does not experience appreciable tension loads that could strip the threaded hole formed in the forward clip rail 58. Likewise, fastener 131 only serves to hold the forward projection 124 of the tab segment 114 against the top of the forward clip rail 58, without experiencing appreciable tension loads that could strip the threaded hole formed in the forward clip rail 58. Any loads experienced on the fasteners 119 or 131 are slight, whether they be shear or tension loads that result from bending moments imparted on the seat stretcher 100. Accordingly, the forward end portion 102 may be secured to the forward clip rail 58 using only one of the fasteners 119 or 131.

In some cases, the sinuous springs 36 in a fully assembled furniture assembly exerts several hundred pounds of tension force between the forward and rearward clip rails 58 and 78. This force not only imparts bending loads on the rearward clip rail 78 between the uprights 72, 74, and 76, but also imparts a twisting or torsional force on the rearward clip rail 78 because the anchor clips 63 are located on top of the clip rail 78. As such, securing the rearward clip rail 78 to the middle upright(s) 76 must account for these dynamics.

Accordingly, in the depicted embodiment, the rearward clip rail 78 as well as the rearward end portion 104 is configured to be secured in place by interaction with the rearward fastener 158, the rearward clip rail 78, and by the shape of the rearward end portion 104. In assembly, the rearward clip rail is passed over the forward stop 96 and placed within the rearward notch 92. In some embodiments, the rearward notch 92 is sized to create an interference fit with the rearward clip rail 78. The rearward clip rail 78 may be translated parallel to the inclined upper edge 94 to enter the rearward notch 92 at an angle relative to horizontal. The rearward clip rail 78 may then be rotated into the rearward notch 92 to effectively be snapped into place in the orientation depicted at FIG. 2.

The rearward end portion 104 of the seat stretcher 100 is positioned so that the mounting hole 154 is aligned with the locating hole 90 of the middle upright 76. The rearward fastener 158 is inserted through the locating hole and tapped into the mounting hole 154 to secure the seat stretcher 100 to the middle upright 76. During the installation of the rearward fastener 158, the seat stretcher 100 may be canted with respect to the final orientation (e.g., rotated upward relative to the position shown in FIG. 1B) for easier alignment of the locating hole 90 and mounting hole 154. After the rearward fastener 158 is secured, the seat stretcher 100 may be rotated into its final orientation, with the forward end portion 102 registered against the forward clip rail 58. Rotation of the seat stretcher 100 into place firmly seats the rearward portion 104 of the seat stretcher 100 against the upper corners of the rearward clip rail 78. The forward end portion 102 is secured to the forward clip rail 58 with one or both of fasteners 119 and 131.

Functionally, the rearward fastener 158 secures the rearward mounting segment 152 of the rearward end portion 104 to the upright 76, as described above. In addition, the rearward mounting segment 152 is seated on the rearward clip rail 78 (FIG. 1B) proximate the rearward apex 153 at the origin of the angle δ (δ being identified in FIG. 5). In assembly, the angle δ effectively "cups" the top of the rearward clip rail 78, so that the rearward portion 104 contacts both upper edges of the rearward clip rail 78 to capture as well as prevent twisting of the rail 78 within the rearward notch 92 of the notched mounting structure 86. In this way, the rearward clip rail 78 is captured within the rearward notch 92 and the forward stop 96 without need for additional fasteners to secure the rearward clip rail 78 to the middle upright 76. The cupping of the rearward mounting segment 152 about the top edges of the rearward clip rail 78 also resists motion of the seat stretcher 100 in the fore/aft direction 64, as well as providing additional load support for the seat stretcher 100. Accordingly, the cupping of the rearward mounting segment 152 about the rearward clip rail 78 may relieve the rearward fastener 158 of a substantial portion of the shear load that would otherwise be imparted by the seat stretcher 100 in the fore/aft direction 64.

Furthermore, by forming the middle uprights 76 as unitary components, there are fewer frame joints in the overall assembly than with conventional, multiple component uprights, thus requiring fewer fastening (e.g., stapling) joints that tend to weaken uprights 76 and overall assembly. The combination or partial combination of the various support mechanisms described above enables durable and reliable support of the rearward portion 104 using only the single rearward fastener 158, and in a process that requires fewer manufacturing steps.

In assembly, the main box 32, uprights 72, 74, and 76, and cap rail 80 are assembled together, with the forward clip rail 58 affixed to the front rail 42 and the rearward clip rail 78 affixed to the upright(s) 76. The tie block(s) 107 may be mounted to the lateral face(s) 106 of the upright(s) 76, for example by stapling. The forward end portion 102 is secured to the forward clip rail 58 with one or both of the fasteners 119 and 131. The rearward end portion 104 of the seat stretcher 100 is registered against the top the rearward clip rail 78. The seat stretcher is sized and configured so that the rearward mounting segment 152 will register against the rearward clip rail 78 proximate the rearward apex 153. The rearward fastener 158 is passed laterally through the respective upright 76 to engage the mounting hole 154 of the rearward mounting segment 152.

Herein, references to directions such as forward, rearward, fore/aft, lateral, upward, and bottom are relative to a furniture assembly that is generally in a working position that is ready to receive occupants. These descriptions are intended to establish relationship between the various directions, and are not strictly limiting. That is, the seat box assembly 30 maybe oriented other than the working position, for example, during manufacturing or shipping.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

The following documents are incorporated by reference herein in their entirety: U.S. Patent Application Publication No. 2003/0151293 to McLarty et al.; U.S. Patent Application Publication No. 2009/0235451 to Gorkin; U.S. Patent Application Publication No. 2010/0264715 to Griggs, Jr.; U.S. Patent Application Publication No. 2012/0248836 to Lejcher et al.; U.S. Pat. No. 7,438,362 to Dotta et al.; U.S. Pat. No. 8,408,653 to Griggs, Jr.; U.S. Pat. No. 9,241,575 to Wang; U.S. Pat. No. 9,345,331 to Saval et al. Incorporation by reference is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A seat stretcher for a furniture assembly, comprising:
   a forward end portion and a rearward end portion separated by a middle portion,
   the forward end portion including an arcuate segment that extends from the middle portion in an upward direction, and a mounting tab segment at a forward extremity of the forward end portion, the mounting tab segment defining a mounting hole that extends through the mounting tab segment,
   the rearward end portion including an angled segment having a first leg and a second leg that extend from an apex and defining an obtuse angle, the first leg extending from the middle portion, the second leg extending upward from the apex, the angled segment including upper and lower rib portions that are diametrically opposed and are coplanar with the obtuse angle,
   the rearward end portion including a rearward mounting segment that extends from the second leg of the angled portion, the rearward mounting segment defining a mounting hole that extends laterally through the rearward mounting segment,
   wherein the forward end portion, the rearward end portion, the middle portion, and the upper and lower rib portions of the reward end portion are substantially centered about a common mid plane and are formed of a metal tubular body.

2. The seat stretcher of claim 1, wherein the middle portion is a straight segment defining a linear axis.

3. The seat stretcher of claim 2, wherein the first leg of the angled segment is concentric with the linear axis of the middle portion.

4. The seat stretcher of claim 1, wherein the arcuate segment is arcuate through a 90 degree angle.

5. The seat stretcher of claim 1, wherein the mounting tab segment includes a base that extends from the arcuate segment and a forward projection at the forward extremity of the forward end portion.

6. The seat stretcher of claim 5, wherein the forward projection of the tab segment includes a bottom surface that is substantially perpendicular to a forward surface of the base.

7. The seat stretcher of claim 1, wherein the upper and lower rib portions extend an entire length of the angled segment.

8. A furniture assembly, comprising:
   a main box including a front rail and a back rail separated by a pair of side rails to define an interior space;
   an upright coupled to an interior face of the back rail;
   a rearward clip rail supported by the upright and extending substantially parallel to the back rail; and a seat stretcher, including:
a forward end portion and a rearward end portion separated by a middle portion,
the forward end portion including an arcuate segment that extends from the middle portion in an upward direction, and a mounting tab segment at a forward extremity of the forward end portion, the mounting tab segment defining a mounting hole that extends through the mounting tab segment,
the rearward end portion including an angled segment having a first leg and a second leg that extend from an apex and defining an obtuse angle, the first leg extending from the middle portion, the second leg extending upward from the apex, the angled segment including upper and lower rib portions that are diametrically opposed and are coplanar with the obtuse angle,
the rearward end portion including a rearward mounting segment that extends from the second leg of the angled portion, the rearward mounting segment defining a mounting hole that extends laterally through the rearward mounting segment,
the forward end portion, the rearward end portion, the middle portion, and the upper and lower rib portions of the reward end portion formed of a metal tubular body and substantially centered about a common mid plane,
wherein the mounting tab segment is coupled to the front rail with a first fastener that extends through the mounting hole of the mounting tab segment, and
wherein the rearward end portion extends over and is supported by the rearward clip rail and is affixed to a lateral face of the upright with a second fastener that extends through the mounting hole of the rearward mounting segment.

9. The furniture assembly of claim 8, wherein at least one of the first fastener and the second fastener is a self-tapping bolt.

10. The furniture assembly of claim 8, wherein the upright is a unitary component.

11. The furniture assembly of claim 10, wherein one or more of the main box, the upright, and the rearward clip rail is made of a wooden material.

12. The furniture assembly of claim 8, wherein the middle portion is a straight segment defining a linear axis.

13. The furniture assembly of claim 12, wherein the first leg of the angled segment is concentric with the linear axis of the middle portion.

14. The furniture assembly of claim 8, wherein the arcuate segment is arcuate through a 90 degree angle.

15. The furniture assembly of claim 8, comprising a forward clip rail affixed to an interior face of the front rail, the mounting tab segment affixed to the forward clip rail.

16. The furniture assembly of claim 15, wherein the mounting tab segment includes a base that extends from the arcuate segment and a forward projection at the forward extremity of the forward end portion, the forward extremity registered on a top edge of the forward clip rail.

17. The furniture assembly of claim 16, wherein the forward projection of the tab segment includes a bottom surface that registers on the top edge of the front rail, the bottom surface being substantially perpendicular to a forward surface of the base, the forward surface registering against an interior face of the front rail.

18. The furniture assembly of claim 8, wherein the upper and lower rib portions extend an entire length of the angled segment.

19. A furniture assembly, comprising:
a main sofa box including a front rail and a back rail separated by a pair of side rails to define an interior space;
a seat back including an upright coupled to an interior face of the back rail;
a seat stretcher, including:
a forward end portion and a rearward end portion separated by a middle portion,
the middle portion being substantially straight and horizontal,
the forward end portion including an arcuate segment that extends from the middle portion to an upward direction, and an upright straight segment adjoining the arcuate segment, and a tapering portion adjoining and positioned above the upright straight segment, and a mounting tab segment unitary with a tapering portion, the mounting tab segment having a vertical base with a forward surface, the vertical base having a hole at the forward surface, and a forward projection unitary with the vertical base, the forward projection extending horizontally with a bottom surface substantially perpendicular to the forward surface of the vertical base, the forward projection defining a tab with a mounting hole that extends through the forward projection.

20. The furniture assembly of claim 19, wherein the rearward end portion includes an angled segment having a first leg and a second leg that extend from an apex and defining an obtuse angle, the first leg extending from the middle portion, the second leg extending upward from the apex, the angled segment including upper and lower rib portions that are diametrically opposed and are coplanar with the obtuse angle,
the rearward end portion including a rearward mounting segment that extends from the second leg of the angled portion, the rearward mounting segment defining a mounting hole that extends laterally through the rearward mounting segment, the forward end portion, the rearward end portion, the middle portion, and the upper and lower rib portions of the reward end portion formed of a metal tubular body and substantially centered about a common mid plane, wherein the mounting tab segment is coupled to the front rail with a first fastener that extends through the mounting hole of the mounting tab segment, and wherein the rearward end portion extends over and is supported by the rearward clip rail and is affixed to a lateral face of the upright with a second fastener that extends through the mounting hole of the rearward mounting segment.

* * * * *